United States Patent
Uemura

(10) Patent No.: US 6,958,763 B2
(45) Date of Patent: Oct. 25, 2005

(54) IMAGE RECORDING DEVICE

(75) Inventor: Takayuki Uemura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 209 days.

(21) Appl. No.: 10/674,462

(22) Filed: Oct. 1, 2003

(65) Prior Publication Data
US 2004/0067085 A1 Apr. 8, 2004

(30) Foreign Application Priority Data
Oct. 2, 2002 (JP) .............................. 2002-289544
Oct. 2, 2002 (JP) .............................. 2002-289545

(51) Int. Cl.[7] .............................. B41J 2/45; G06F 7/00
(52) U.S. Cl. .................................................... 347/237
(58) Field of Search ............................... 347/233, 237, 347/900, 235, 250, 38, 40–42; 358/1.1, 1.9

(56) References Cited

U.S. PATENT DOCUMENTS 6,688,724 B2 * 2/2004 Miyagawa et al. ........... 347/38
6,873,349 B2 * 3/2005 Uemura ....................... 347/235
2002/0064317 A1 * 5/2002 Hirawa ......................... 382/305
2003/0106448 A1 * 6/2003 Uemura ........................ 101/477

FOREIGN PATENT DOCUMENTS

JP 9-23320 A 1/1997

* cited by examiner

Primary Examiner—Huan Tran
(74) Attorney, Agent, or Firm—Sughrue Mion, PLLC

(57) ABSTRACT

An image recording device has: a recording head which has plural channels arranged rectilinearly, and which can illuminate light beams; a line memory storing image data, which is based on a number of main scan lines of one main scan by the recording head, as one unit; and a buffer storing, for each of the respective channels, data stored in the line memory. At a look up table, channel reshuffling control is executed, and pixel offset amounts of lines corresponding to channels of reshuffle destinations are added, and data is transferred to the buffer. When a channel order is reshuffled due to movement of the recording head, reshuffling control is carried out at the table in accordance with an order at a time of reshuffling, and at a time of transferring the image data from the line memory to the buffer.

20 Claims, 10 Drawing Sheets

F I G. 5A
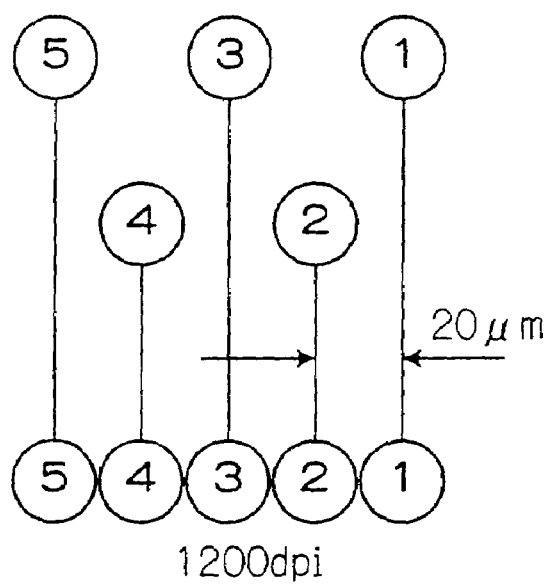
1200dpi
F I G. 5B
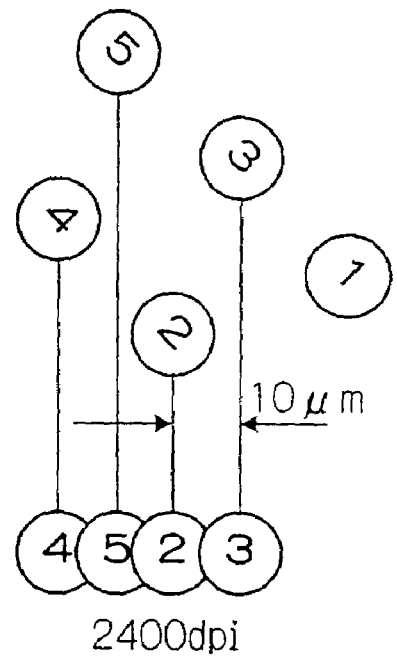
2400dpi

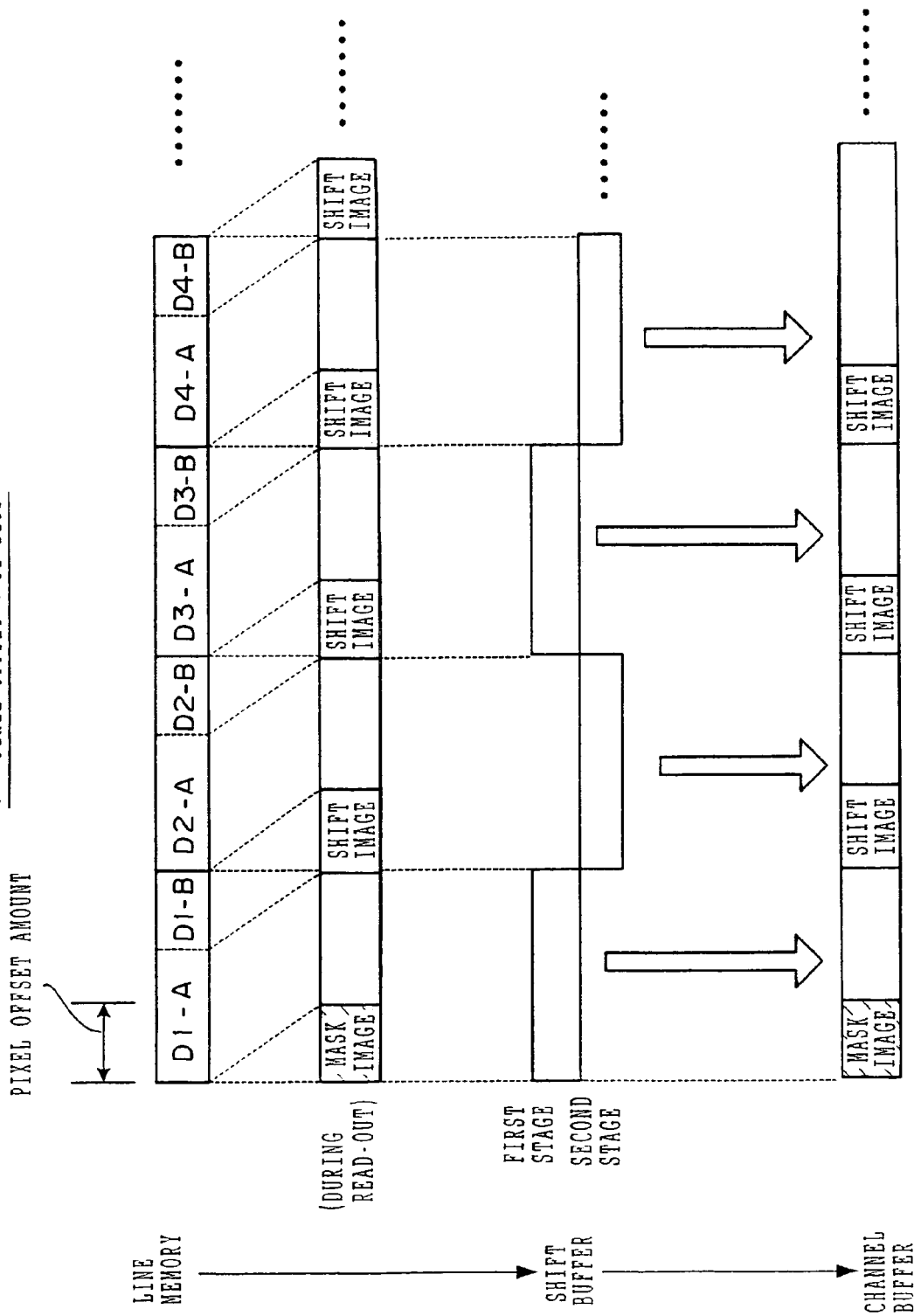

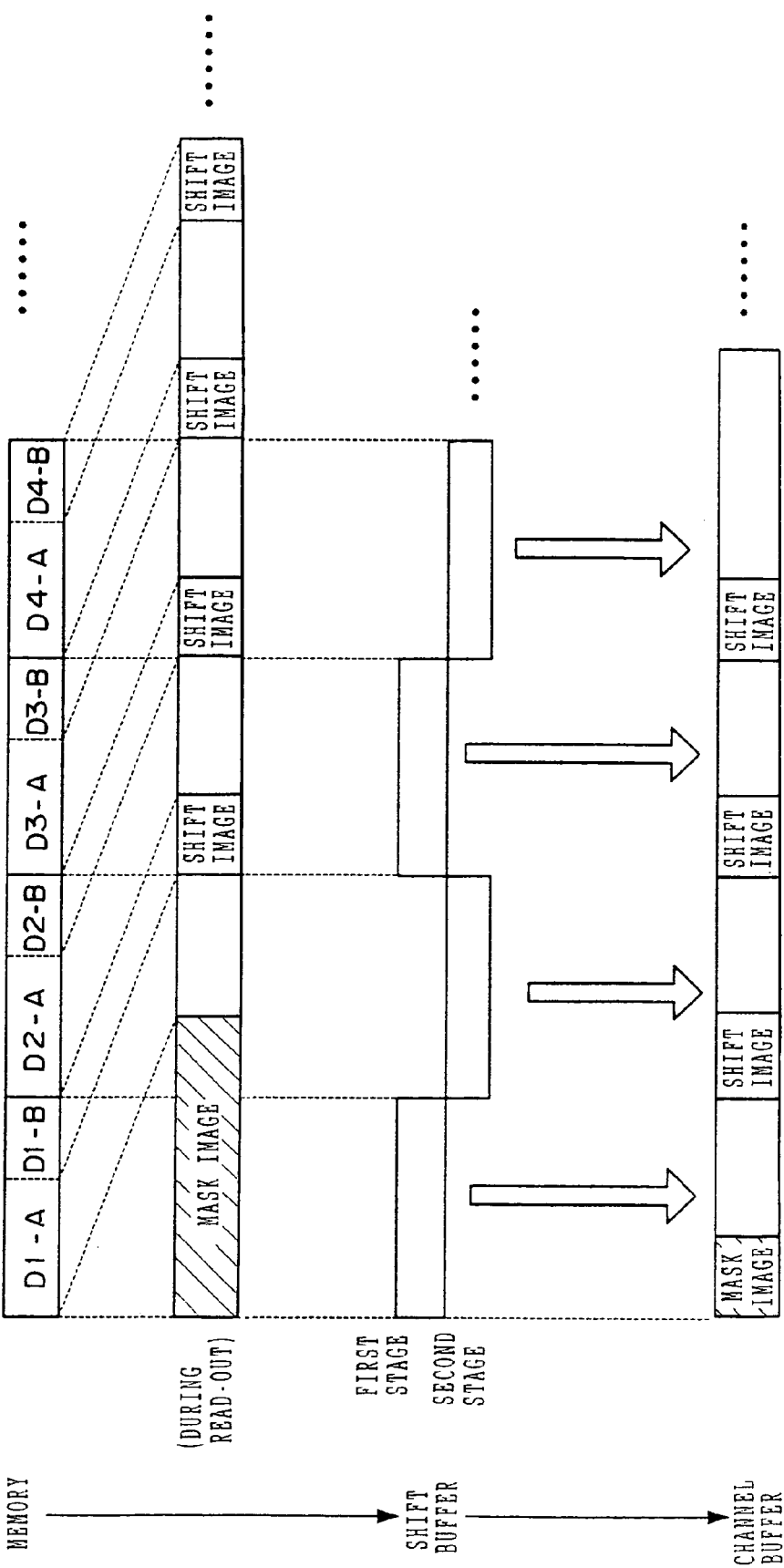

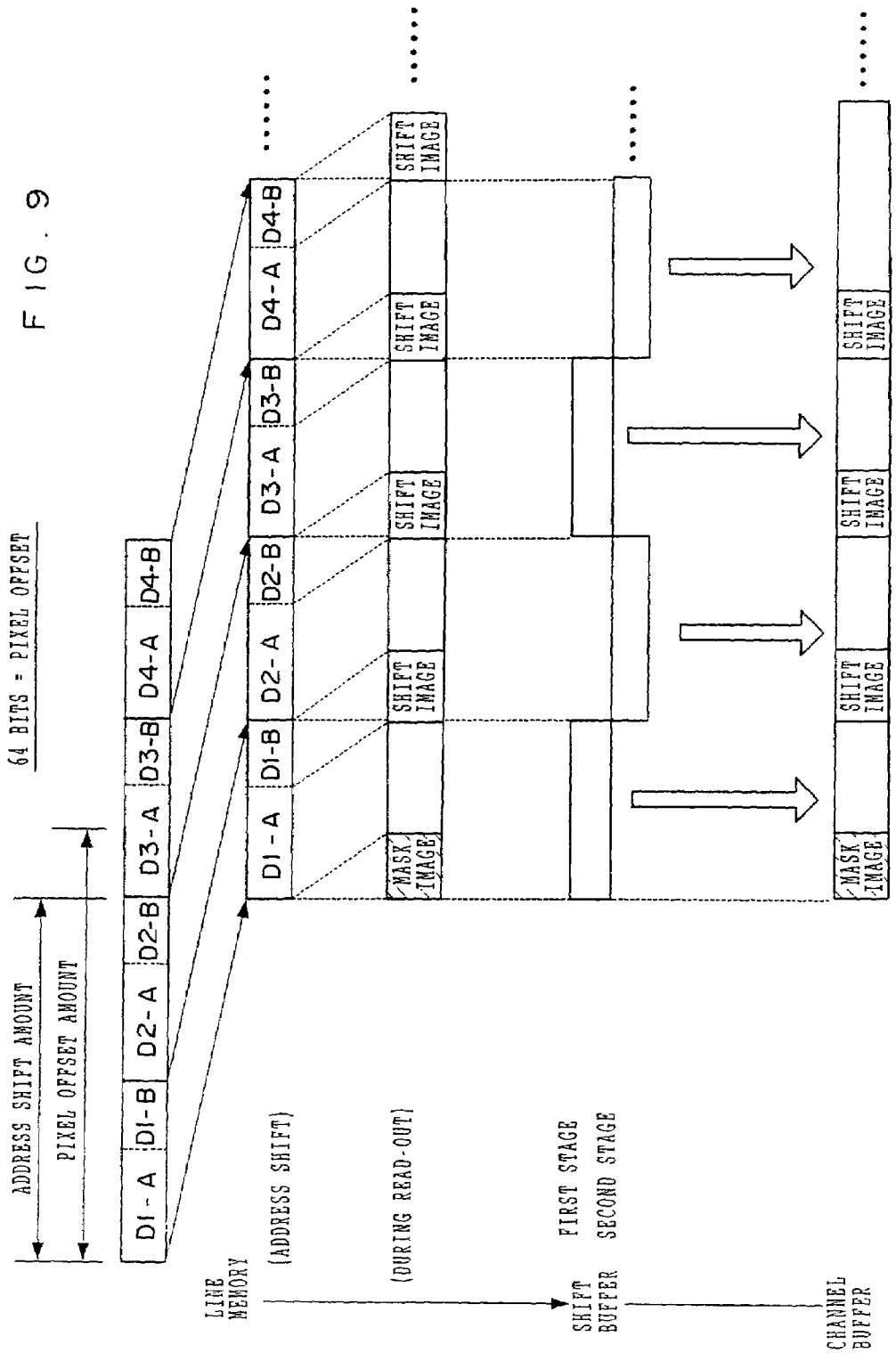

IMAGE RECORDING DEVICE

CROSS-REFERENCE TO RELATED APPLICATION

This application claims priority under 35 USC 119 from Japanese Patent Application Nos. 2002-289544 and 2002-289545, the disclosures of which are incorporated by reference herein.

BACKGROUND OF THE INVENTION

1. Technical Field

The present invention relates to an image recording device which has a recording head which can, on the basis of input image data, simultaneously illuminate respective light beams from light sources of plural channels, and which records an image by scanning the light beams onto a recording material.

2. Description of the Related Art

Techniques (printing plate exposing devices), which use a sheet-shaped recording material (and in particular, a printing plate in which a photosensitive layer is provided on a support) and record an image directly by a laser beam or the like onto the photosensitive surface (emulsion surface) of the printing plate, have come to be developed. With such techniques, it is possible to rapidly record an image onto a printing plate.

In an automatic printing plate exposing device using the technique of recording an image onto a printing plate, in a state in which the printing plate is wound on the peripheral surface of a rotating drum, input image data is expanded into line image data (at an image expanding section). While the rotating drum is rotated at high speed (main scanning), on the basis of the line image data transferred in from the image expanding section, the output of the laser beam from a laser forming a portion of an exposure optical system is controlled so that a recording head (exposure head), which together with the laser forms the exposure optical system, moves along the axial direction of the rotating drum (subscanning). An image is thereby recorded on the printing plate.

Here, at the recording head, by outputting a plurality of laser beams simultaneously and scanning main scan lines of plural channels simultaneously, image recording can be made to be faster.

Japanese Patent Application Laid-Open (JP-A) No. 9-23320 (Japanese Patent No. 3179680) proposes an image recording device which can ensure a high speed of image recording while appropriately correcting tilting of the exposed image with respect to the original image so as to prevent distortion of the image. In particular, refer to paragraphs 0023 (FIG. 1) and 0028 (FIG. 3) of said patent.

Here, in an exposure optical system which carries out main scanning by plural channels simultaneously, there are cases in which the positions, in the main scanning direction, of the respective channels are offset from the recorded positions in the original image. A quantitative offset in pixels arises when, for example, a plurality of channels are offset alternately in the main scanning direction and are arranged in two or more rows.

Moreover, pixel offset in the main scanning direction also arises depending on the specifications for image recording, such as the setting of the resolution, the setting of the number of channels, the setting of interlacing/non-interlacing, and the like.

In order to correct this, it has been thought to hold a buffer (an FIFO, a memory or the like) for each channel, temporarily accumulate image data therein, and carry out positional correction by adjusting the reading timing for outputting in the main scanning direction.

Or, it has been thought to hold a buffer for each channel, and carry out positional correction by a combination of shifting the addresses read from a line memory at the time of temporarily accumulating the image, and shifting the image at the time of writing to the buffers.

However, in positional correction such as described above, in an exposure optical system in which the order of the channels changes, control for handling the respective orders is complex, and it is not easy to address such a situation.

As one example of a change in the channel order, in the case of setting the resolution, when the pitch of the channels which are simultaneously scanned is made to be a pitch which is more narrow than usual, such a change is handled by physically tilting the recording head with respect to the scan surface. In this case, if each channel is one line, the order of the channels does not change. However, if each channel is two or more lines, the channel order changes.

Further, there are cases in which the order of plural channels changes in accordance with the specifications for image recording, such as the setting of the resolution, the setting of the number of channels, the setting of interlacing/non-interlacing, and the like.

In particular, in the case of setting the resolution, when the pitch of the channels to be simultaneously scanned is to be made more narrow than usual, this is handled by physically tilting the recording head with respect to the scan surface. In this case, if each channel is one line, the order of the channels does not change. However, if each channel is two or more lines, the channel order changes.

When a change in the order of the channels is predicted, it is necessary to provide hardware corresponding to the respective channel orders. This leads to the structure of the device becoming complex and the number of parts increasing.

SUMMARY OF THE INVENTION

In view of the aforementioned, an object of the present invention is to provide an image recording device which has plural channels, and which, when plural main scan lines are to be stored simultaneously, can easily address pixel offset in the main scanning direction and changes in the channel order which changes in accordance with the image recording specifications, without leading to complexity of the device and an increase in the number of parts.

A first aspect of the present invention is an image recording device having a recording head which can, on the basis of input image data, simultaneously illuminate respective light beams from light sources of plural channels arranged rectilinearly. The image recording device records an image by main scanning and subscanning the light beams onto a recording material. The image recording device also has: a line memory storing the input image data, with image data based on a number of main scan lines of one main scan by the recording head being one unit; a buffer storing, for each of the respective channels, the input image data stored in the line memory; a transfer control device shifting, in a main scanning direction, image data read out from the line memory and transferring the image data to the buffer, on the basis of pixel offset amounts in the main scanning direction between the respective main scan lines; and an image data reshuffling control device reshuffling, in units of channels and on the basis of an order of the respective channels of the recording head, image data to be transferred to the buffer from the line memory.

In accordance with the first aspect of the present invention, when image data of an amount of the number of main scan lines of one main scan is to be stored in the buffer and distributed to the respective channels, the transfer control device, on the basis of the pixel offset amounts in the main scanning direction between the respective channels, shifts, in the main scanning direction, the image data read-out from the line memory, and transfers the image data to the buffer.

At this time, if there were changes in the channel order, conventionally, it was necessary to change the shift amounts in accordance with this channel order.

Here, at the stage when the image data is transferred from the line memory to the buffer, the image data reshuffling control device reshuffles the image data on the basis of the substantial order of the respective channels of the recording head (i.e., the order of the respective channels at the time of image recording).

In this way, the necessary shift amount is added to each channel, and the image data is transferred to the buffer. Therefore, changes in the shift amounts of the image data and in the channel order can be easily handled. It is possible to avoid an increase in the number of parts, and the device can be simplified.

In the device of the first aspect of the present invention, the transfer control device may carry out transfer from the line memory to the buffer by burst transfer in which the image data is successively transferred in units of a predetermined amount of image data, and may, on the basis of the pixel offset amounts and a burst transfer amount, selectively execute at least one of address shifting and pixel shifting.

In accordance with this structure, the transfer from the line memory to the buffer is carried out by burst transfer of an SDRAM or the like. The amount of transfer of one time of this burst transfer and the pixel offset amount are compared, and address shifting and pixel shifting are combined. In this way, when, in particular, there is a pixel offset amount which is greater than or equal to the burst transfer amount, the transfer speed can be made faster.

In the present invention, a group of the channels arranged rectilinearly may be arranged in two or more rows.

In accordance with this structure, in a case in which a group of the channels arranged rectilinearly is arranged in two or more rows (e.g., in a case in which a group of channels arranged rectilinearly in the subscanning direction is arranged in two or more rows in the main scanning direction), when, for example, the recording head is rotated and the pitch of the perpendicular lines of the respective channels onto the recording surface of the recording material is changed in a direction of becoming more narrow, there are cases in which the channels are reshuffled at the border of a predetermined angle of rotation. The transfer destinations of the image data are reshuffled by the image data reshuffling control device in accordance with this reshuffling of channels.

In the present invention, the image data reshuffling control device may have a look-up table in which reshuffle destinations of the respective channels are set in advance in accordance with an order of the channels which physically changes in accordance with movement of the recording head for changing a scan line pitch.

In accordance with this structure, switching control is made to be even more simple by providing a look-up table in advance in accordance with the order of the channels which physically changes in accordance with the rotation of the recording head or the like.

Further, the present invention may be structured such that lines drawn by a group of the channels arranged rectilinearly do not overlap in the main scanning direction.

In the image recording device, if the lines drawn by the group of channels arranged rectilinearly overlap in the main scanning direction, it will not be clear whether reshuffling of the image data is needed or not, and problems may arise in the reshuffling control. Further, if there is overlapping in the main scanning direction, there will be double writing, and the object of the present invention will not be able to be achieved. Thus, by setting, in advance, main scanning direction overlapping which can occur due to rotation of the recording head, it is possible to avoid trouble at the time of reshuffling the image data by the image data reshuffling control device.

Moreover, in the present invention, the image data reshuffling control device may have a look-up table in which reshuffle destinations of the respective channels are set in advance in accordance with image recording specifications which are any of resolution, a number of channels to be substantially used, presence/absence of interlacing, subscanning direction, and a combination of two or more thereof.

In accordance with this structure, even if the recording head does not move, the order of the channels changes in accordance with image recording specifications which include the resolution, the number of channels to be substantially used, the presence/absence of interlacing, the subscanning direction, or a combination of two or more thereof. By providing such a look-up table for coordinating the order of the respective channels, reshuffling control is even more simple.

The present invention may further comprise a prohibiting device which, when image data is not stored at channels stored in the buffer, prohibits illumination of light beams as channels which are not substantially used.

In the image recording device, depending on the channel order, there are cases in which not all of the channels provided at the recording head are used. In such cases, if image data for scanning up to the previous time remains, unnecessary scanning will be executed. Thus, the prohibiting device prohibits illumination of light beams corresponding to channels which are substantially unused.

As the way in which such prohibition is implemented, illumination of light beams can be prohibited by the unused channels transferring null data. Further, generally, the channel order does not change on a single sheet of recording material. Therefore, it suffices to not use unused channels themselves from the start.

A second aspect of the present invention is an image recording device having a recording head which can, on the basis of input image data, simultaneously illuminate respective light beams from light sources of plural channels arranged rectilinearly. The image recording device records an image by main scanning and subscanning the light beams onto a recording material. The image recording device also has: a line memory storing the input image data, with image data based on a number of main scan lines of one main scan by the recording head being one unit; a buffer storing, for each of the respective channels, the input image data stored in the line memory; and an image data reshuffling control device which, on the basis of an order of the respective channels of the recording head, reshuffles image data in units of the channels from the line memory to the buffer.

In the image recording device of the second aspect, when image data of an amount of the number of main scan lines of one main scan is to be stored in the buffer and distributed to the respective channels, the image data reshuffling control device reshuffles the image data on the basis of the substantial order of the respective channels of the recording head (i.e., the order of the respective channels at the time of image recording).

Namely, there are cases in which the main scan lines are scanned on the recording material in an order which is different than the order of the channels arranged at the recording head. In such cases, even if hardware is not provided for each pattern of channel orders, reshuffling is carried out at the time of transferring the image data from the line memory to the buffer. Thus, it is possible to handle respective situations by using a single hardware. It is possible to avoid an increase in the number of parts, and the device can be simplified.

In the second aspect, a group of the channels arranged rectilinearly may be arranged in two or more rows.

In accordance with this structure, in a case in a group of the channels arranged rectilinearly is arranged in two or more rows (e.g., in a case in which a group of channels arranged rectilinearly in the subscanning direction is arranged in two or more rows in the main scanning direction), when, for example, the recording head is rotated and the pitch of the perpendicular lines of the respective channels onto the recording surface of the recording material is changed in a direction of becoming more narrow, there are cases in which the channels are reshuffled at the border of a predetermined angle of rotation. The transfer destinations of the image data can be reshuffled by the image data reshuffling control device in accordance with this reshuffling of channels.

The second aspect of the present invention may be structured such that lines drawn by a group of the channels arranged rectilinearly do not overlap in the main scanning direction.

In the image recording device, if the lines drawn by the group of channels arranged rectilinearly overlap in the main scanning direction, it will not be clear whether reshuffling of the image data is needed or not, and problems may arise in the reshuffling control. Further, if there is overlapping in the main scanning direction, there will be double writing, and the object of the present invention will not be able to be achieved. Thus, by setting, in advance, main scanning direction overlapping which can occur due to rotation of the recording head, it is possible to avoid trouble at the time of reshuffling the image data by the image data reshuffling control device.

In the second aspect of the present invention, the image data reshuffling control device may have a look-up table in which reshuffle destinations of the respective channels are set in advance in accordance with an order of the channels which physically changes in accordance with movement of the recording head for changing a scan line pitch.

In accordance with this structure, switching control is made to be even more simple by providing a look-up table in advance in accordance with the order of the channels which physically changes in accordance with the rotation of the recording head or the like.

In the second aspect of the present invention, the image data reshuffling control device may have a look-up table in which reshuffle destinations of the respective channels are set in advance in accordance with image recording specifications which are any of resolution, a number of channels to be substantially used, presence/absence of interlacing, subscanning direction, and a combination of two or more thereof.

In accordance with the second aspect of the present invention, even if the recording head does not move, the order of the channels changes in accordance with image recording specifications which include the resolution, the number of channels to be substantially used, the presence/absence of interlacing, the subscanning direction, or a combination of two or more thereof. By providing such a look-up table for coordinating the order of the respective channels, reshuffling control is even more simple.

The second aspect of the present invention may further comprise a prohibiting device which, when image data is not stored at channels stored in the buffer, prohibits illumination of light beams as channels which are not substantially used.

In the image recording device, depending on the channel order, there are cases in which not all of the channels provided at the recording head are used. In such cases, if image data for scanning up to the previous time remains, unnecessary scanning will be executed. Thus, the prohibiting device prohibits illumination of light beams corresponding to channels which are substantially unused.

As the way in which such prohibition is implemented, illumination of light beams can be prohibited by the unused channels transferring null data. Further, generally, the channel order does not change on a single sheet of recording material. Therefore, it suffices to not use unused channels themselves from the start.

BRIEF DESCRIPTION OF THE DRAWINGS

FIG. 5A is a schematic diagram showing a state in which resolution is changed by physical movement of light beam illumination points at the time of plural simultaneous main scanning, and shows the relative positional relationships at the time of 1200 dpi.

FIG. 5B is a schematic diagram showing the relative positional relationships at the time of 2400 dpi, in the state shown in FIG. 5A in which resolution is changed.

FIG. 7 is a block diagram showing the flow of data relating to pixel offset correction control ((1) 0 pixel offset<32 bits)).

FIG. 8 is a block diagram showing the flow of data relating to pixel offset correction control ((2) 32 bits pixel offset<64 bits)).

FIG. 9 is a block diagram showing the flow of data relating to pixel offset correction control ((3) pixel offset 64 bits)).

DETAILED DESCRIPTION OF THE INVENTION

Structure of Image Recording Device

The basic structure of an automatic printing plate exposing device 10, which is used as an image recording device, will be described hereinafter.

Figure 1:
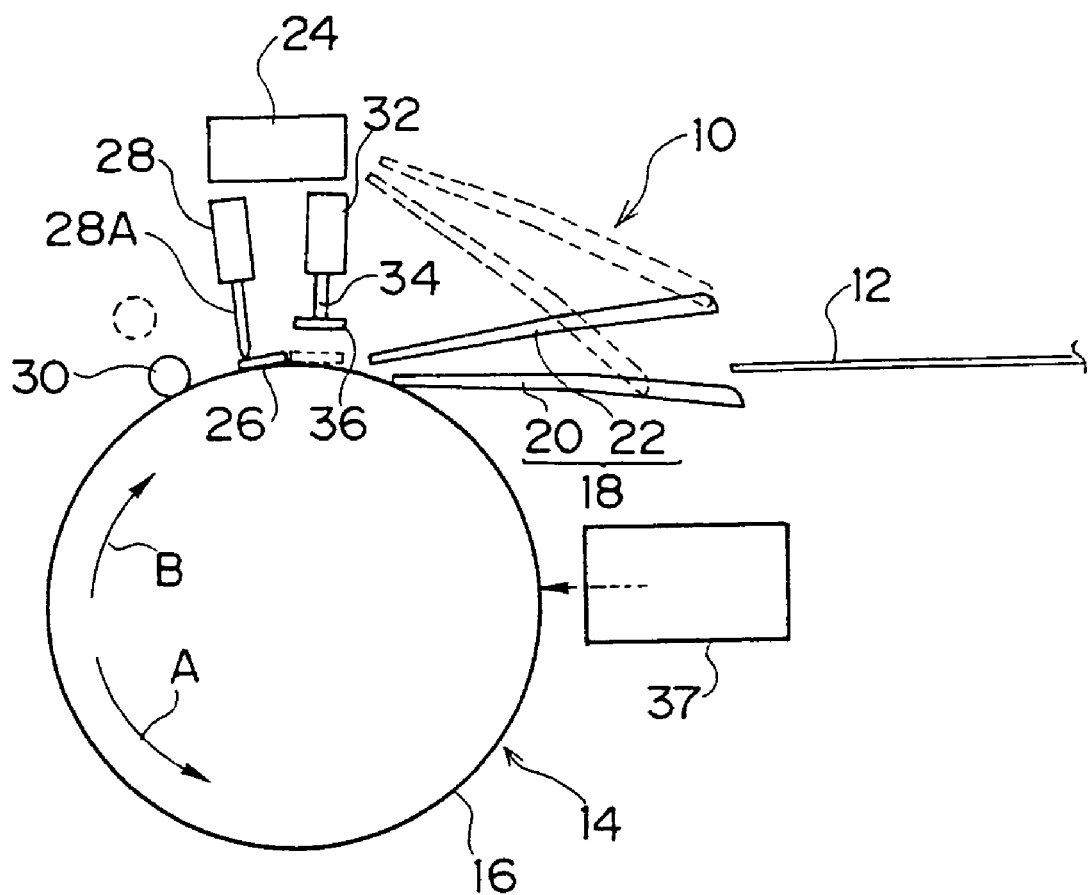
FIG. 1 is a schematic diagram of an automatic printing plate exposing device relating to an embodiment.

As shown in FIG. 1, an exposure section 14 of the automatic printing plate exposing device 10 is structured such that a rotating drum 16, around whose peripheral surface a printing plate 12 is trained and held, is the main portion of the exposure section 14. The printing plate 12 is guided by a conveying guide unit 18, and is fed in toward the rotating drum 16 from the direction of a line tangent to the rotating drum 16.

A puncher 24 is provided above (in FIG. 3) the rotating drum 16.

The conveying guide unit 18 is structured by a plate supplying guide 20 and a plate discharging guide 22.

The relative positional relationship of the plate supplying guide 20 and the plate discharging guide 22 of the conveying guide unit 18 is such that the plate supplying guide 20 and the plate discharging guide 22 form a sideways V shape. The plate supplying guide 20 and the plate discharging guide 22 rotate over a predetermined angle around the right end portion side thereof in FIG. 1. Due to this rotation, the plate supplying guide 20 and the plate discharging guide 22 are selectively made to correspond to the rotating drum 16 or the puncher 24.

The printing plate 12 is first guided by the plate supplying guide 20 and fed into the puncher 24 where notches for positioning are formed in the leading end of the printing plate 12.

After being processed by the puncher 24, the printing plate 12 is temporarily returned to the plate supplying guide 20, and is thereby moved to a position corresponding to the rotating drum 16.

The rotating drum 16 is rotated by an unillustrated driving means in a direction of attaching and exposing the printing plate 12 (the direction of arrow A in FIG. 1), and a direction of removing the printing plate 12 (the direction of arrow B in FIG. 1) which is the direction opposite to the attachment/exposure direction.

As shown in FIG. 1, leading end chucks 26 are attached to predetermined positions of the outer peripheral surface of the rotating drum 16 provided in the exposure section 14. At the exposure section 14, when the printing plate 12 is to be attached to the rotating drum 16, first, the rotating drum 16 is stopped at a position (printing plate attachment position) at which the leading end chucks 26 oppose the leading end of the printing plate 12 which has been fed-in by the plate supplying guide 20 of the conveying guide unit 18.

An attachment unit 28 is provided in the exposure section 14 so as to oppose the leading end chucks 26 at the printing plate attachment position. Due to extending/retracting rods 28A of the attachment unit 28 being extended to press one end sides of the leading end chucks 26, the printing plate 12 can be inserted between the leading end chucks 26 and the peripheral surface of the rotating drum 16.

In the exposure section 14, in the state in which the leading end of the printing plate 12 is inserted between the leading end chucks 26 and the rotating drum 16, the extending/retracting rods 28A of the attachment unit 28 are withdrawn such that their pressing of the leading end chucks 26 is cancelled. In this way, the leading end of the printing plate 12 is nipped and held between the leading end chucks 26 and the peripheral surface of the rotating drum 16.

At this time, the leading end of the printing plate 12 is positioned by abutting positioning pins (not illustrated) provided at the rotating drum 16.

In the exposure section 14, when the leading end of the printing plate 12 is fixed to the rotating drum 16, the rotating drum 16 is rotated in the attachment/exposure direction. In this way, the printing plate 12, which has been fed-in from the plate supplying guide 20 of the conveying guide unit 18, is trained around the peripheral surface of the rotating drum 16.

A squeeze roller 30 is disposed in a vicinity of the peripheral surface of the rotating drum 16 at the downstream side, in the attachment/exposure direction, of the printing plate attachment position. Due to the squeeze roller 30 moving toward the rotating drum 16, the squeeze roller 30 pushes the printing plate 12, which is trained around the rotating drum 16, toward the rotating drum 16, so as to make the printing plate 12 fit tightly to the peripheral surface of the rotating drum 16.

Further, a trailing end chuck attaching/detaching unit 32 is disposed in the exposure section 14 at the rotating drum 16 attachment/exposure direction upstream side of the squeeze roller 30, in a vicinity of the upstream side of the home position of the leading end chucks. At the trailing end chuck attaching/detaching unit 32, trailing end chucks 36 are attached to the distal ends of shafts 34 which project out toward the rotating drum 16. In a standby state, the trailing end chucks 36 are held in a state of being separated from the rotating drum 16.

At the exposure section 14, when the trailing end of the printing plate 12 trained around the rotating drum 16 opposes the trailing end chuck attaching/detaching unit 32, the shafts 34 are projected out so as to attach the trailing end chucks 36 to predetermined positions of the rotating drum 16. In this way, the trailing end of the printing plate 12 is nipped and held between the trailing end chucks 36 and the rotating drum 16.

In the exposure section 14, when the leading end and the trailing end of the printing plate 12 are held at the rotating drum 16, the squeeze roller 30 is moved away from the rotating drum 16. Thereafter, in the exposure section 14, while the rotating drum 16 is rotated at high speed at a predetermined rotational speed (main scanning), light beams, which are modulated on the basis of image data, are illuminated from a recording head portion 37 synchronously with the rotation of the rotating drum 16.

Figure 2:
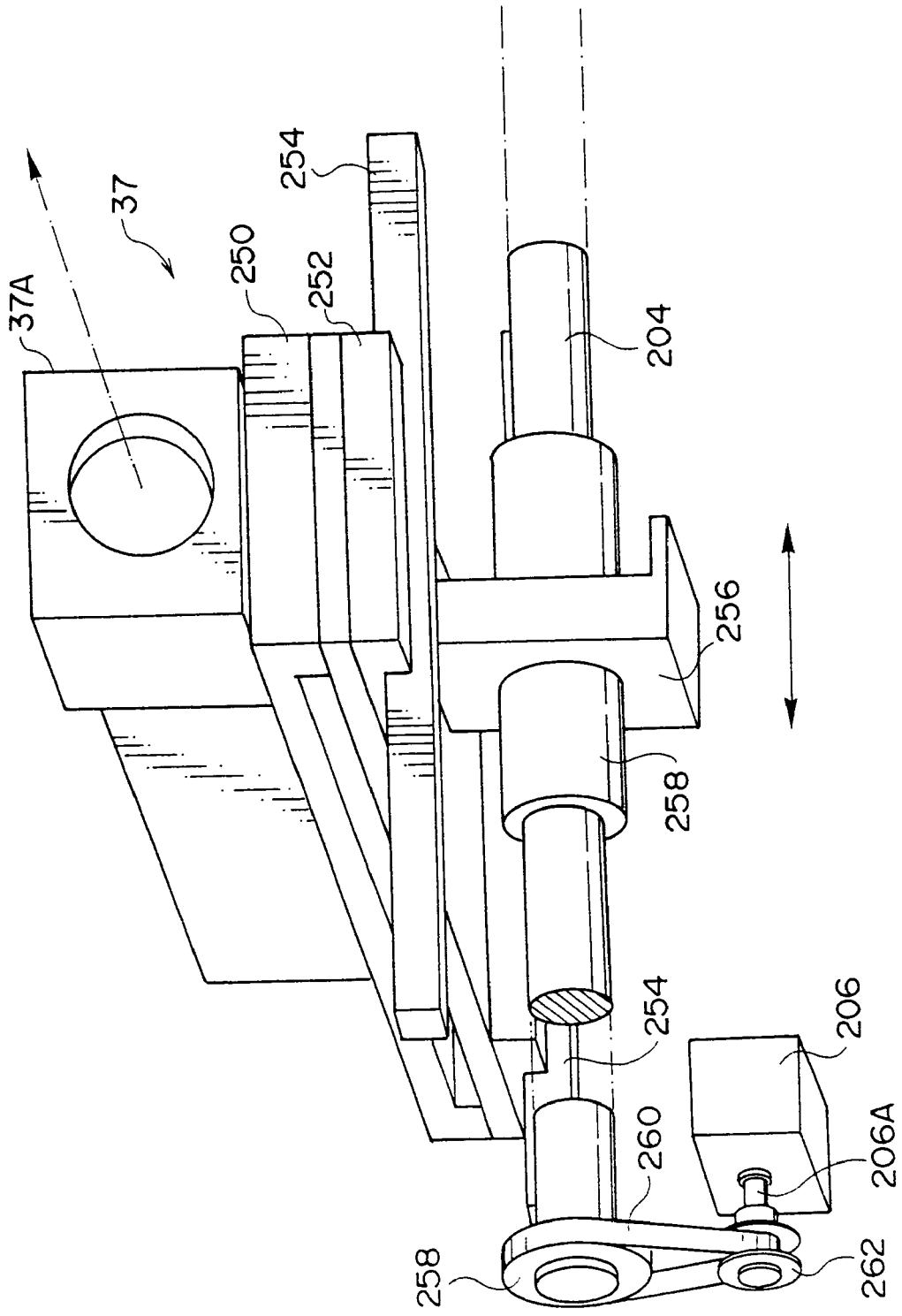
FIG. 2 is a perspective view showing the basics of a recording head.

The basic structure of the recording head portion 37 is shown in FIG. 2. A recording head main body 37A of the recording head portion 37 is supported at a base portion 250. The base portion 250 is disposed on a sliding base 252 which is a sliding body forming a ball screw mechanism portion. In this way, the recording head main body 37A moves together with the sliding base 252.

The sliding base 252 is guided in the axial direction of the rotating drum 16 (see FIG. 1) along two rails 254 which are parallel to one another. Further, a connecting portion 256, which is for connection with a shaft 204 of the ball screw mechanism portion, is mounted to the bottom portion of the sliding base 252.

A tubular portion 258 is provided at the connecting portion 256. A female screw, which screws-together with a male screw formed at the shaft 204, is formed at the tubular portion 258.

A sprocket 258 is attached coaxially to one end portion of the shaft 204. A belt 260 is trained around the sprocket 258. The belt 260 is also trained around a sprocket 262 attached to a rotating shaft 206A of a pulse motor 206. In this way, the driving force of the pulse motor 206 (the rotation of the rotating shaft 206A) can be transmitted to the shaft 204 via the belt 260, and the rotational speed of the shaft 204 can be controlled by the rotational speed of the pulse motor 206.

Figure 3:
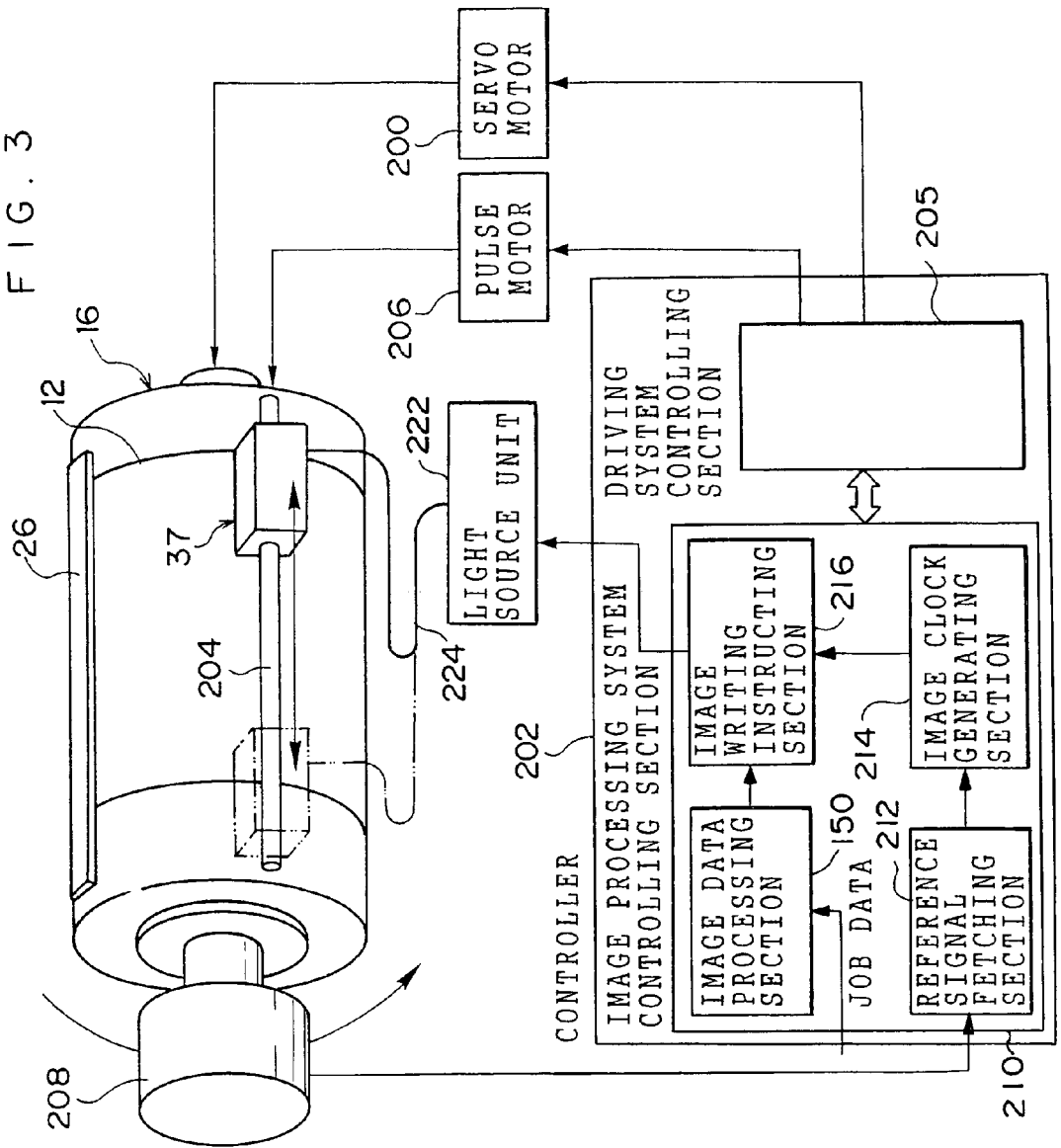
FIG. 3 is a block diagram showing the basics of a controller for driving a rotating drum and the recording head.

As shown in FIG. 3, the recording head main body 37A is positioned with a position of being away from the peripheral surface of the rotating drum 16 at one axial direction end of the rotating drum 16 being the home position of the recording head main body 37A. The recording head main body 37A is subscan-moved by being moved in the axial direction of the rotating drum 16 by the driving force of the pulse motor 206.

In this way, due to the recording head main body 37A moving (subscanning) along the shaft 204 in accordance with the rotation of the rotating drum 16 (main scanning), an image based on image data is scan-exposed on the printing plate 12.

As shown in FIG. 1, in the exposure section 14, when scan-exposure onto the printing plate 12 is completed, the rotating drum 16 is temporarily stopped at a position where the trailing end chucks 36, which are holding the trailing end of the printing plate 12, oppose the trailing end chuck attaching/detaching unit 32. The trailing end chucks 36 are removed from the rotating drum 16. In this way, the trailing end of the printing plate 12 is freed.

Thereafter, by rotating the rotating drum 16 in the direction of removing the printing plate 12, the printing plate 12 is discharged to the plate discharging guide 22 of the conveying guide unit 18 along a direction tangent to the rotating drum 16 from the rear end side of the printing plate 12, and thereafter, is conveyed to a developing device which is the subsequent step.

The control system for rotation of the rotating drum 16, movement of the recording head portion 37, and image recording by the recording head portion 37 and based on an image signal, is shown in FIG. 3.

The rotating drum 16 is rotated by the driving force of a servo motor 200. The rotational speed of the servo motor 200 is controlled on the basis of a drive signal from a driving system controlling section 205 of a controller 202.

Further, as shown in FIG. 2, the recording head portion 37 moves in the axial direction of the rotating drum 16 due to the shaft 204, at which the male screw of the ball screw mechanism portion is formed, being axially rotated by the pulse motor 206. The driving speed of the motor 206 is controlled on the basis of a drive signal from the driving system controlling section 205 of the controller 202.

A rotary encoder 208 is coaxially attached to the shaft portion of one axial direction end portion of the rotating drum 16.

A pulse signal corresponding to the rotational speed of the rotating drum 16 is sent from the rotary encoder 208 to a reference signal fetching section 212, which forms one portion of an image processing system controlling section 210 at the controller 202.

The reference signal fetching section 212 is connected to an image clock generating section 214. At the time of generating an image clock, an image clock, to which the main scan starting time or the like is added for each predetermined number of rotations (e.g., one rotation), is generated on the basis of the rotation of the rotating drum 16, and is sent out to an image writing instructing section 216.

Image data, of the number of lines required for main scanning, is simultaneously inputted to the image writing instructing section 216 from an image data processing section 150 (details of which will be described later), and is sent to a light source unit 222 at a predetermined time.

A plurality of light sources (LDs or the like) are disposed at the light source unit 222. The lights from the respective light sources are guided to the recording head portion 37 via an optical fiber 224.

At the image writing instructing section 216, the recording head portion 37 is controlled such that light beams, which are modulated on the basis of the inputted image signal, are illuminated onto the printing plate 12. An image is recorded onto the printing plate 12 due to the rotation of the rotating drum 16 (main scanning) and the movement of the recording head portion 37 (subscanning).

Figure 4:
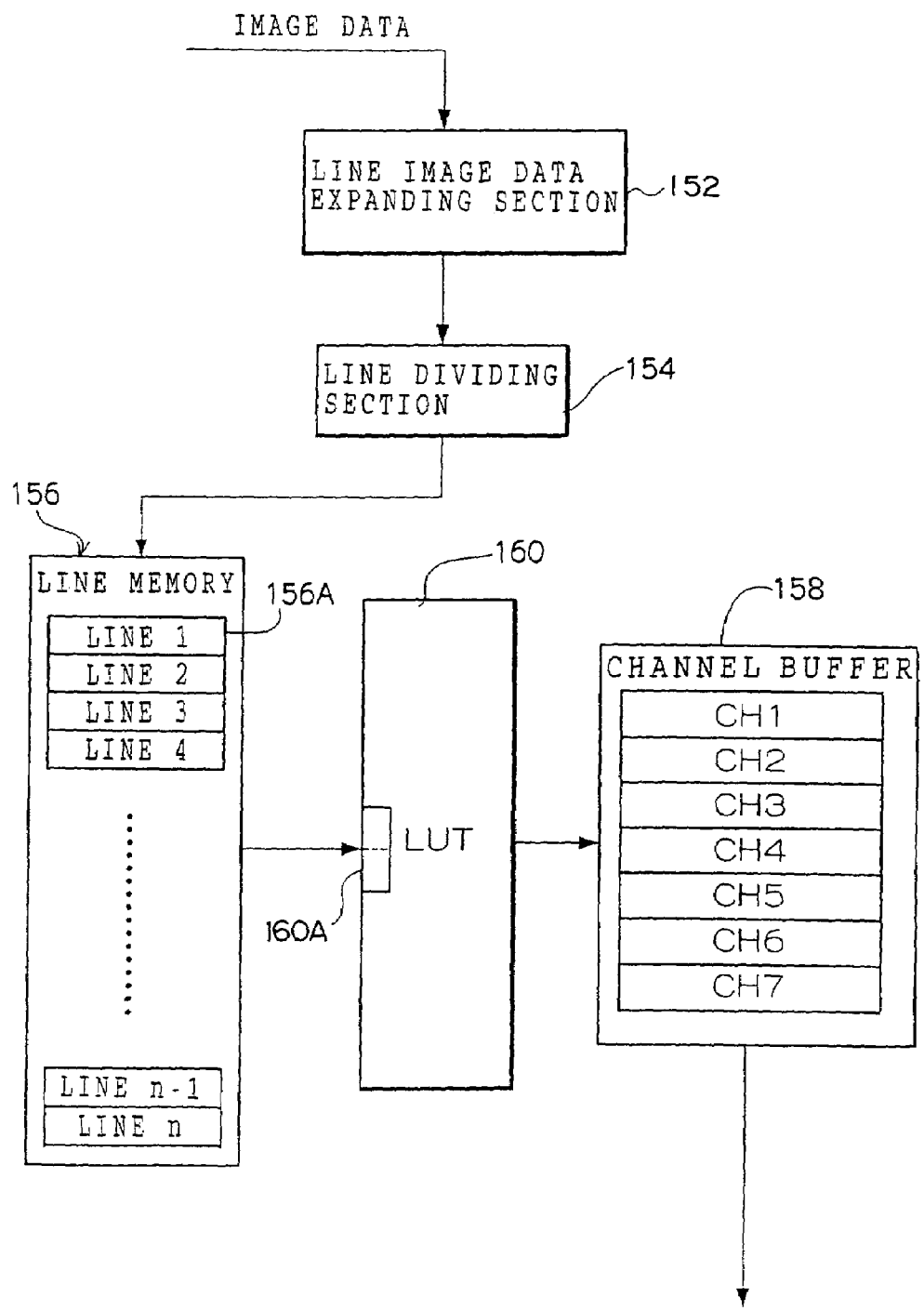
FIG. 4 is a control block diagram for transferring image data in an image data processing section to a channel buffer.

The structure of the hardware of the image data processing section 150 (see FIG. 3) is shown in FIG. 4.

The inputted image data is expanded into line image data at a line image data expanding section 152.

The line image data expanded at the line image data expanding section 152 is inputted to a line dividing section 154. After the data has been divided into predetermined numbers of pixels in units of respective lines, the data are stored in a line memory 156.

(Reshuffling of Channels)

Here, at the actual recording head 37, light beams from about 31 channels to about 87 channels are illuminated simultaneously. However, in order to simplify explanation, description hereinafter will be given of a case in which a number of channels N is 5 channels.

Line memory regions 156A of the number of channels N (=5) needed for one simultaneous main scan are provided at the line memory 156. The line data are stored therein in the order in which the read image data was expanded.

The data of each line stored in the line memory 156 is transferred, by burst transfer of an SDRAM for example, to a channel buffer 158 in units of groups of image data of a predetermined amount.

As shown in FIG. 5A, the illumination points of the light beams arranged at the recording head 37 are arranged at a predetermined pitch in the subscanning direction (the pitch of the perpendicular lines of the illumination points with respect to the printing plate 12), and are disposed to be alternately offset in the main scanning direction. The pitch is related to the resolution in the subscanning direction. In the present embodiment, in a usual resolution mode, the resolution, in a state in which the recording head 37 physically opposes the rotating drum 16 head-on, is 1200 dpi.

The recording head 37 is rotatable. Actually, the light beam illumination opening at the interior of the recording head 37 moves, but hereinafter, this will be explained as rotation of the recording head 37. Due to the rotation of the recording head 37, as shown in FIG. 5B, the aforementioned pitch is narrowed and the resolution in the subscanning direction can be increased. In the present embodiment, in the high resolution mode, the resolution in the state in which the recording head 37 is physically rotated by a predetermined angle with respect to the rotating drum 16 is 2400 dpi.

However, in the case of the high resolution mode, as shown in FIG. 5B, for some of the channels, the order thereof is reversed, and some other of the channels become unused channels.

Thus, in the present embodiment, a look-up table 160 (called an "LUT" hereinafter) is interposed between the line memory 156 and the channel buffer 158. On the basis of the channel reshuffling patterns set in the LUT 160, reshuffling of the channel buffer 158 to which the data is transferred is carried out.

Namely, a resolution setting signal is inputted to the LUT 160. At the time of the usual resolution mode, control in which there are no changes to the order is carried out (through control). At the time of the high resolution mode, control in which the order is changed (reshuffling control) is carried out.

For example, in a case such as that of FIG. 5B, the order "1", "2", "3", "4", "5" becomes "3", "2", "5", "4" in the high resolution *mode*. T*hus*, without using the LD corresponding to channel "1", the LUT 160 transfers the line data to the remaining four channels respectively. Namely, the line data of the first channel in the line memory 156 is transferred to the third channel in the channel buffer 158. (The line data is transferred as "1"→"3", and thereafter, "2"→"2", "3"→"5", and "4"→"4". Note that non-image data is transferred to the first channel of the channel buffer 158 (null reading).) Note that, in terms of software, the transfer to the first channel of the channel buffer 158 may be cancelled.

By carrying out reshuffling control by the table of the LUT 160, there is no need to provide hardware for transferring to respectively different channel buffers 158 in the usual resolution mode and the high resolution mode, and it is possible to handle the situation by using a single hardware.

(Handling Pixel Offset)

By reshuffling the channels as described above, coordination among the main scan lines can be achieved. However, due to the main scanning write position being offset every other line in FIG. 5A and due to the channel reshuffling being executed in FIG. 5B, the write position is offset randomly.

Thus, in the present embodiment, at the time of transfer from the line memory 156 to the channel buffer 158, when the data is sent to the LUT 160, it is temporarily stored in a shift buffer 160A, and when the data is transferred to the channel buffer 158, a pixel offset amount for each line is added in advance.

In the present embodiment, an SDRAM is used as the line memory 156, and carries out burst transfer of 32 bits×2 (64 bits) to the shift buffer 160A. Note that, hereinafter, explanation will be given by considering 1 pixel to be 1 bit.

There are the following three types of pixel offset amounts: (1) 0 pixel offset<32 bits, (2) 32 bits pixel offset<64 bits, (3) pixel offset 64 bits. For cases in which the pixel offset is 64 bits or more, address shifting is carried out by the line memory 156 in 64 bit units, whereas in cases of less than 64 bits, shifting is carried out, at the time of writing to the shift buffer 160A, by pixel shifting by the amount of pixel offset.

(1) 0 Pixel Offset<32 Bits

As shown in FIG. 7, when the pixel offset amount is less than 64 bits and less than 32 bits, on the basis of the usual addresses, the image data is read out from the line memory 156 and is shifted by the pixel shift amount, and is written into the first stage of the shift buffer 160A. The image data exceeding 32 bits due to the addition of the shift amount is written into the second stage of the shift buffer 160A. At the shift buffer 160A, by repeating the transfer of image data to the channel buffer 158 in the order of first stage→second stage→first stage . . . , transfer is completed.

(2) 32 Bits Pixel Offset<64 Bits

As shown in FIG. 8, when the pixel offset amount is greater than or equal to 32 bits, either null data is written into the first stage of the shift buffer 160A, or masking is carried out, and pixel shifting equivalent to that of above-described case (1) is carried out from the second stage. Note that, in this case, an amount of 32 bits is subtracted from the designated pixel shift amount.

(3) 64 Bits Pixel Offset

As shown in FIG. 9, when the pixel offset is 64 bits or greater, at the time of the initial reading out to the shift buffer 160A, either null reading can be carried out or masking can be carried out at the first stage and the second stage, but there is a corresponding loss of time. Thus, by carrying out address shifting at the line memory 156, pixel offset of an amount of 64 bits×n (wherein n is the quotient of the pixel offset amount/64 bits) is eliminated. As a result, the pixel offset amount becomes less than 64 bits.

Thereafter, the processing of above-described (1) or (2) is carried out on the pixel offset amount obtained by subtracting 64 bits×n (wherein n is the quotient of the pixel offset amount/ 64 bits) from the designated pixel offset amount.

Hereinafter, operation of the present embodiment will be described.

Operation at the above-described automatic printing plate exposing device 10 is as follows.

The printing plate 12 on the plate supplying guide 20 is fed-in toward the rotating drum 16, and the leading end portion of the printing plate 12 is held by the leading end chucks 26. Due to the rotating drum 16 being rotated in this state, the printing plate 12 is trained tightly onto the peripheral surface of the rotating drum 16. Thereafter, due to the trailing end of the printing plate 12 being held by the trailing end chucks 36, preparations for exposure are completed.

In this state, the image data is read, and exposure processing by the light beams from the recording head portion 37 is started. The exposure processing is so-called scan-exposure in which the recording head portion 37 moves in the axial direction of the rotating drum 16 while the rotating drum 16 is rotated at high speed (main scanning).

The image data is expanded into line data by the line image data expanding section 152, and is divided into line data for each channel by the line dividing section 154. The data are stored in the respective line data regions of the line memory 156.

The stored line data is transferred, without a delay in image recording, by, for example, 32 bit burst transfer, to the channel buffer 158 via the LUT 160. On the basis of this line data, the LDs are made to emit light, and main scanning of plural lines of data stored in the channel buffer 158 is carried out simultaneously, such that exposure processing is carried out.

When exposure processing is completed, the conveying guide unit 18 is switched (the plate discharging guide 22 is made to correspond to the rotating drum 16). Then, the printing plate 12 trained on the rotating drum 16 is discharged out from a direction tangent to the rotating drum 16. At this time, the printing plate 12 is fed to the plate discharging guide 22.

When the printing plate 12 is fed to the plate discharging guide 22, the conveying guide unit 18 is switched such that the plate discharging guide 22 is made to correspond to the discharge opening and discharges the printing plate 12. The developing section is provided in this direction of discharging, and the printing plate 12 is subsequently subjected to developing processing.

(Channel Reshuffling Control)

Here, the present embodiment has the function of changing the resolution by physically rotating and moving the recording head 37. Namely, in the usual resolution mode (1200 dpi), the recording head 37 opposes the rotating drum 16 head-on, and the channels arranged at the recording head 37 are in order (see FIG. 5A). However, in the high resolution mode (2400 dpi), the recording head 37 is rotated with respect to the rotating drum 16 and the pitch of the respective illumination dots is narrowed. At this time, at some of the channels, the positions are reshuffled. At some other of the channels, the pitch between that channel and the channel adjacent thereto becomes different than the pitches between the other channels, and that channel cannot be used.

Thus, in the present embodiment, at the time of the usual resolution mode and at the time of the high resolution mode, channel reshuffling control is carried out at the LUT 160.

Figure 6:
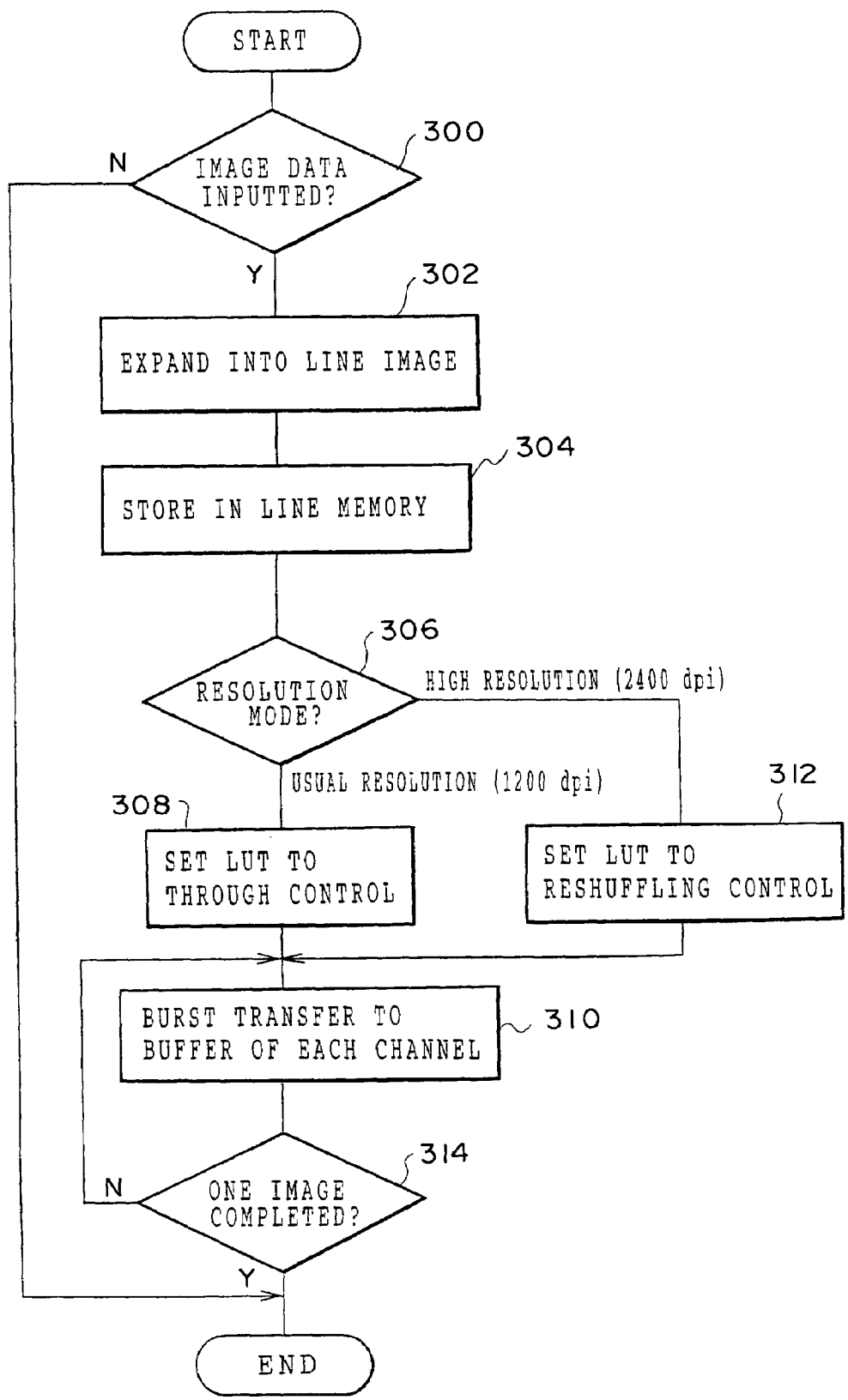
FIG. 6 is a flowchart showing a channel reshuffling control routine relating to the embodiment.

Hereinafter, the flow of processings, whose main portion is the channel reshuffling control, will be described in accordance with the flowchart of FIG. 6.

In step 300, a determination is made as to whether image data has been inputted to the line image data expanding section 152. When the determination is affirmative, the routine moves on to step 302 where the image data is expanded into a line image. Next, the routine proceeds to step 304 where, at the line dividing section 154, the data is stored in the line memory 156.

In subsequent step 306, in order to select the table in the LUT 160, the resolution mode is identified. If it is determined in step 306 that the resolution mode is the usual resolution mode, as shown in FIG. 5A, the respective channels are lined up in the order of their numbers. Therefore, the routine moves on to step 308 where the control at the LUT 160 is set to be through control, and the routine moves on to step 310. In step 310, transfer of the image data from the line memory 156 to the channel buffer (here, burst transfer) is carried out. When through control is set in step 308, the image data of the respective lines is transferred from the line memory 156 to the channel buffer 158 in order.

On the other hand, when the resolution mode is judged to be the high resolution mode in step 306, as shown in FIG. 5B, the respective channels are not in order, and an unused channel exists. Therefore, the routine proceeds to step 312 where control at the LUT 160 is set to be reshuffling control, and the routine moves on to step 310. In step 310, transfer of the image data from the line memory 156 to the channel buffer (here, burst transfer) is carried out. When reshuffling control is set in step 312, in step 310, the image data of the respective lines are transferred from the line memory 156 while being reshuffled on the basis of the table of the LUT 160.

In subsequent step 314, it is judged whether transfer of data of one image has been completed. If the judgment is negative, the routine returns to step 310 and the above-described processes are repeated.

(Control for Handling Pixel Offset)

As shown in FIG. 5A, the respective main scan lines are offset every other line, alternately in the main scanning direction. Therefore, a case in which this is fixed, the pixel offset in the main scanning direction can be corrected by adding in advance a mask image to those main scan lines in accordance with the amount of offset, i.e., the pixel offset amount.

However, in the present embodiment, channel reshuffling is carried out. When there is a case such as that in FIG. 5B, the balance of the order of the channels breaks down, and lines at which the pixel offset is to be corrected cannot be specified unconditionally.

Thus, when the image data is transferred from the line buffer 156 to the channel buffer 158 via the LUT 160, channel reshuffling control is carried out by the LUT 160, and the pixel offset amounts of the reshuffle destinations are set in the form of a table in the LUT 160. In this way, appropriate pixel offset correction after reshuffling is possible.

As shown in FIG. 7, when the pixel offset amount is less than 64 bits and is less than 32 bits (i.e., in case (1)), the image data is read from the line memory 156 on the basis of the usual addresses.

Next, the image data is shifted by a pixel shift amount corresponding to the line of the reshuffle destination set by the LUT 160, and is written into the first stage of the shift buffer 160A. The image data which exceeds 32 bits due to the addition of this shift amount is written into the second stage of the shift buffer 160A.

At the shift buffer 160A, transfer is completed by repeating the transfer of image data to the channel buffer 158 in the order of first stage→second stage→first stage . . . .

As shown in FIG. 8, when the pixel offset amount is greater than or equal to 32 bits (i.e., in case (2)), at the first stage of the shift buffer 160A, either null data is written in, or masking is carried out, and pixel shifting which is equivalent to that of above-described case (1) is carried out from the second stage. Note that, in this case, an amount of 32 bits is subtracted from the designated pixel shift amount.

As shown in FIG. 9, when the pixel offset is 64 bits or more (i.e., in case (3)), address shifting is carried out at the line memory 156. Namely, address shifting is carried out until a pixel offset amount from which 64 bits×n (wherein n is the quotient of the pixel offset amount/64 bits) is subtracted. In this way, the pixel offset amount can be made to be 64 bits or less.

Thereafter, it suffices to carry out the processing of above-described (1) or (2) on the pixel offset amount obtained by subtracting 64 bits×n (wherein n is the quotient of the pixel offset amount/64 bits) from the designated pixel offset amount.

In the above-described case of pixel offset, the image data can also be shifted either by storing the pixel shift amounts in advance, or by computing the pixel shift amounts in accordance with the order of the channels after channel reshuffling. However, when channel reshuffling was carried out randomly, hardware and the like corresponding respectively thereto had to be provided, such that the number of parts increased and the structure of the device became complex.

In contrast, in the present embodiment, at the LUT 160, the channel reshuffling control is carried out, and transfer to the channel buffer 158 is carried out by adding the pixel offset amount of the line corresponding to the channel of the reshuffle destination. Thus, there is no need to provide hardware corresponding to the respective channel orders and pixel offset amounts, and it is possible to decrease the number of parts and simplify the structure of the device.

Note that, in the above embodiment, description is given of reshuffling at the time of image data transfer corresponding to changes in the channel order, which can be occur in cases in which the recording head 37 physically rotates and moves (in actuality, the illumination points within the recording head 37 move) in order to change the resolution. However, even if the recording head 37 does not move, there are cases in which the channel order changes on the basis of the image recording specifications such as changing of the resolution (thinning scanning), the selection of interlacing/non-interlacing (interlaced scanning), the setting of the number of channels, and the like. In consideration of these cases, reshuffling tables and pixel offset amount tables can be provided in advance in the LUT 160, or the LUT 160 can be structured such that new tables can be registered therein. In this way, there is no need for the addition of hardware.

Reshuffling control in accordance with the selection of interlacing/non-interlacing will now be described.

When the image data read out from the line memory 156 is to be transferred to the channel buffer 158, the number of readout lines is counted.

At this time, the read-out lines are changed in accordance with the interlacing/non-interlacing. Namely, at the time of non-interlacing, continuous lines are read out. At the time of one pixel interlacing, every other line is read out. At the time when the image data which is read out from the line memory 156 is to be stored in the channel buffer 158, the number of lines is counted as described above, and the channel buffer 158 is designated in order to store via the LUT 160.

As described above, in the present embodiment, when the channel order is reshuffled in accordance with movement of the recording head 37, reshuffling control is carried out at the LUT 160 at the time of transfer of the image data from the line memory 156 to the channel buffer 158, in accordance with the order at the time of reshuffling. In this way, there is no need to provide hardware corresponding to the respective channel orders, and it is possible to decrease the number of parts and simplify the structure of the device.

Note that, in the above embodiment, description is given of reshuffling at the time of image data transfer corresponding to changes in the channel order, which can occur in cases in which the recording head 37 physically rotates and moves (in actuality, the illumination points within the recording head 37 move) in order to change the resolution. However, even if the recording head 37 does not move, there are cases in which the channel order changes on the basis of the image recording specifications such as changing of the resolution (thinning scanning), the selection of interlacing/non-interlacing (interlaced scanning), the setting of the number of channels, and the like. In consideration of these cases, reshuffling tables can be provided in advance in the LUT 160, or the LUT 160 can be structured such that new tables can be registered therein. In this way, there is no need for the addition of hardware.

Reshuffling control in accordance with the selection of interlacing/non-interlacing will now be described.

When the image data read out from the line memory 156 is to be transferred to the channel buffer 158, the number of readout lines is counted.

At this time, the read-out lines are changed in accordance with the interlacing/non-interlacing. Namely, at the time of non-interlacing, continuous lines are read out. At the time of one pixel interlacing, every other line is read out. At the time when the image data which is read out from the line memory 156 is to be stored in the channel buffer 158, the number of lines is counted as described above, and the channel buffer 158 is designated in order to store via the LUT 160.

Further, as in the present embodiment, even if the recording head 37 is not rotated in order to change the resolution, cases of changing the transfer timing of the image data are possible.

Figure 10A:
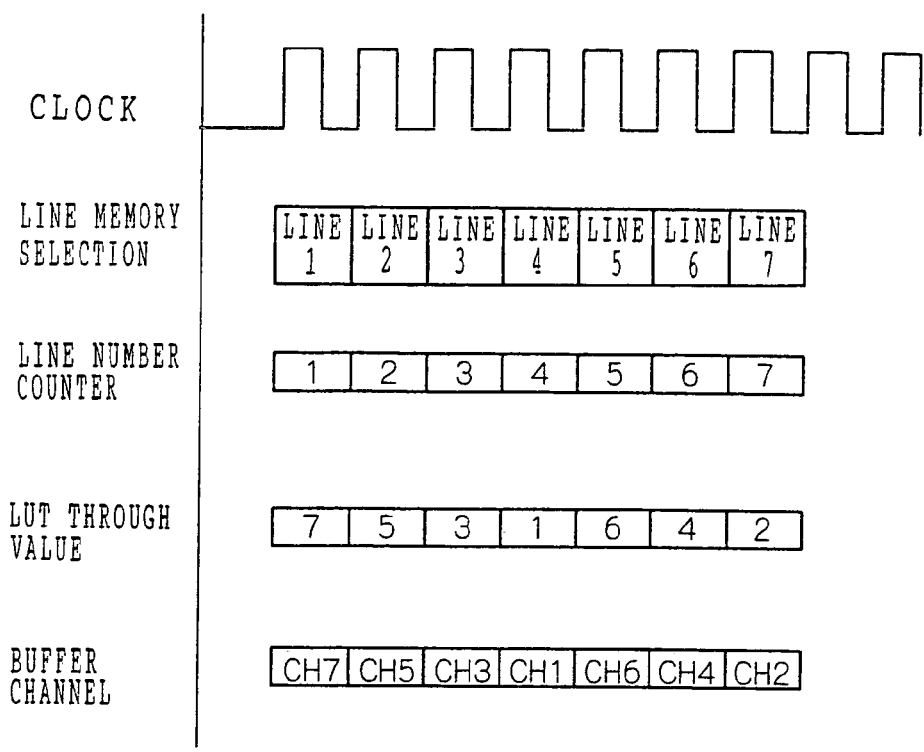
FIG. 10A is a time chart showing an example of wide-use control of channel reshuffling control.
Figure 10B:
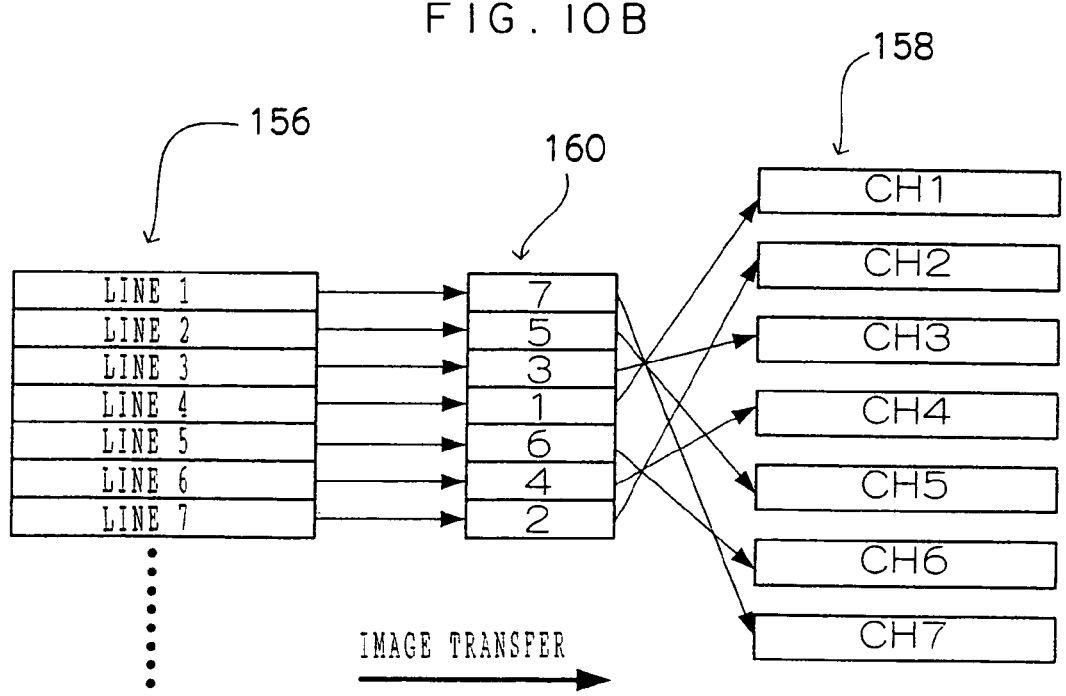
FIG. 10B is a block diagram showing processes of image transfer in accordance with channel reshuffling control.

For example, as shown in FIGS. 10A and 10B, in a case in which the lines to be simultaneously main scanned are seven channels, it is assumed that the order of the channels is "7, 5, 3, 1, 6, 4, 2". In this case, a table for reshuffling in the manner of 1→7, 2→5, 3→3, 4→1, 5→6, 6→4, 7→2, is provided in the LUT 160. In this way, it is possible to handle the set channel order.

Moreover, in a case in which exposure of the five channel specifications of "3, 1, 6, 4, 2" among the seven channels is designated, the channels to be used are advanced up as "3, 1, 6, 4, 2, 7, 5" in the LUT 160, and null reading is carried out for the unnecessary channels. Exposure of five channel specifications can thereby be handled.

In this way, the LUT 160 can be applied so as to handle widely-used channel orders, without any direct relation to the particular structure of rotation of the recording head 37.

As described above, the present invention has the excellent effect that, when plural channels are provided and plural main scan lines are to be stored simultaneously, pixel offset in the main scanning direction and changes in the channel order which changes in accordance with the image recording specifications, can be easily addressed without leading to complexity of the device and an increase in the number of parts.

What is claimed is:

1. An image recording device comprising:
    a recording head having light sources of plural channels arranged rectilinearly, and able to simultaneously illuminate light beams from the respective channels on the basis of input image data, and able to main scan and subscan the light beams onto a recording material in order to record an image;
    a line memory storing the input image data, with image data based on a number of main scan lines of one main scan by the recording head being one unit;
    a buffer storing, for each of the respective channels, the input image data stored in the line memory;
    a transfer control device shifting, in a main scanning direction, image data read out from the line memory and transferring the image data to the buffer, on the basis of pixel offset amounts in the main scanning direction between the respective main scan lines; and
    an image data reshuffling control device reshuffling, in units of channels and on the basis of an order of the respective channels of the recording head, image data to be transferred to the buffer from the line memory.

2. The image recording device of claim 1, wherein the transfer control device carries out transfer from the line memory to the buffer by burst transfer in which the image data is successively transferred in units of a predetermined amount of image data, and can, on the basis of the pixel offset amounts and a burst transfer amount, selectively execute at least one of address shifting and pixel shifting.

3. The image recording device of claim 2, wherein the plural channels arranged rectilinearly are arranged in two or more rows.

4. The image recording device of claim 2, wherein the image data reshuffling control device has a look-up table in which reshuffle destinations of the respective channels are set in advance in accordance with image recording specifications which are any of resolution, a number of channels to be substantially used, presence/absence of interlacing, subscanning direction, and a combination of two or more thereof.

5. The image recording device of claim 3, wherein the image data reshuffling control device has a look-up table in which reshuffle destinations of the respective channels are set in advance in accordance with an order of the channels which physically changes in accordance with movement of the recording head for changing a scan line pitch.

6. The image recording device of claim 3, wherein lines drawn by a row of the channels arranged rectilinearly do not overlap in the main scanning direction.

7. The image recording device of claim 6, further comprising a prohibiting device which, when image data is not stored at channels stored in the buffer, prohibits illumination of light beams as channels which are not substantially used.

8. An image recording device comprising:
    a recording head having light sources of plural channels arranged rectilinearly, and able to simultaneously illuminate light beams from the respective channels on the basis of input image data, and able to main scan and subscan the light beams onto a recording material in order to record an image;

a line memory storing the input image data, with image data based on a number of main scan lines of one main scan by the recording head being one unit;

a buffer storing, for each of the respective channels, the input image data stored in the line memory; and an image data reshuffling control device which, on the basis of an order of the respective channels of the recording head, reshuffles image data in units of the channels from the line memory to the buffer.

9. The image recording device of claim 8, wherein the plural channels arranged rectilinearly are arranged in two or more rows.

10. The image recording device of claim 9, wherein lines drawn by a group of the channels arranged rectilinearly do not overlap in the main scanning direction.

11. The image recording device of claim 9, wherein the image data reshuffling control device has a look-up table in which reshuffle destinations of the respective channels are set in advance in accordance with image recording specifications which are any of resolution, a number of channels to be substantially used, presence/absence of interlacing, subscanning direction, and a combination of two or more thereof.

12. The image recording device of claim 10, wherein the image data reshuffling control device has a look-up table in which reshuffle destinations of the respective channels are set in advance in accordance with an order of the channels which physically changes in accordance with movement of the recording head for changing a scan line pitch.

13. The image recording device of claim 11, further comprising a prohibiting device which, when image data is not stored at channels stored in the buffer, prohibits illumination of light beams as channels which are not substantially used.

14. An image recording method using an image recording device having: (a) a recording head having light sources of plural channels arranged rectilinearly, and able to simultaneously illuminate light beams from the respective channels on the basis of input image data, and able to main scan and subscan the light beams onto a recording material in order to record an image; (b) a line memory storing the input image data, with image data based on a number of main scan lines of one main scan by the recording head being one unit; and (c) a buffer storing, for each of the respective channels, the input image data stored in the line memory, said method comprising the steps of:

on the basis of pixel offset amounts in a main scanning direction between the respective main scan lines, shifting, in the main scanning direction, image data read out from the line memory and transferring the image data to the buffer; and reshuffling, in units of channels and on the basis of an order of the respective channels of the recording head, image data to be transferred to the buffer from the line memory.

15. The method of claim 14, wherein the step of transferring to the buffer includes steps of carrying out transfer from the line memory to the buffer by burst transfer in which the image data is successively transferred in units of a predetermined amount of image data, and, on the basis of the pixel offset amounts and a burst transfer amount, selectively executing at least one of address shifting and pixel shifting.

16. The method of claim 14, wherein the step of reshuffling in units of channels includes a step of setting reshuffle destinations of the respective channels in advance in accordance with an order of the channels which physically changes in accordance with movement of the recording head for changing a scan line pitch.

17. The method of claim 14, wherein the step of reshuffling in units of channels includes a step of setting reshuffle destinations of the respective channels in advance in accordance with image recording specifications which are any of resolution, a number of channels to be substantially used, presence/absence of interlacing, subscanning direction, and a combination of two or more thereof.

18. The method of claim 14, further comprising a step of prohibiting illumination of light beams as channels which are not substantially used, when image data is not stored at channels stored in the buffer.

19. The method of claim 14, wherein the step of reshuffling in units of channels includes a step of processing the image data in units of the channels from the line memory to the buffer.

20. The method of claim 17, further comprising a step of drawing lines by the channels arranged rectilinearly, without the lines overlapping in the main scanning direction.

* * * * *